US005216221A

United States Patent [19]

Carkhuff

[11] Patent Number: 5,216,221

[45] Date of Patent: Jun. 1, 1993

[54] PLASMA ARC TORCH POWER DISABLING MECHANISM

[75] Inventor: Donald W. Carkhuff, Florence, S.C.

[73] Assignee: ESAB Welding Products, Inc., Florence, S.C.

[21] Appl. No.: 822,076

[22] Filed: Jan. 17, 1992

[51] Int. Cl.[5] .......... B23K 9/00

[52] U.S. Cl. .......... 219/121.51; 219/121.48; 219/121.54; 219/121.5

[58] Field of Search .......... 219/121.52, 121.5, 121.48, 219/121.54, 121.57, 74, 75, 121.51, 121.36

[56] References Cited

U.S. PATENT DOCUMENTS

| | | | |
|---|---|---|---|
| 4,580,032 | 4/1986 | Carkhuff | 219/121 PM |
| 4,598,191 | 7/1986 | Marhic et al. | 219/121 PW |
| 4,692,582 | 9/1987 | Marhic | 219/121 PT |
| 4,701,590 | 10/1987 | Hatch | 219/121.5 |
| 4,814,577 | 3/1989 | Dallavalle et al. | 219/121.57 |
| 4,929,811 | 5/1990 | Blankenship | 219/121.54 |
| 4,959,520 | 9/1990 | Okada et al. | 219/121.54 |
| 4,967,055 | 10/1990 | Raney et al. | 219/121.49 |
| 4,973,816 | 11/1990 | Haberman | 219/121.48 |
| 5,013,885 | 5/1991 | Carkhuff et al. | 219/121.5 |

*Primary Examiner*—Mark H. Paschall
*Attorney, Agent, or Firm*—Bell, Seltzer, Park & Gibson

[57] ABSTRACT

A plasma arc torch has an outer heat shield removably secured onto the torch body. The heat shield includes an electrically conductive member secured on the interior surface of the heat shield and in electrical contact with the nozzle assembly or a nozzle assembly retainer member when the nozzle assembly and heat shield are secured onto the torch body. A closed loop electrical circuit is completed through a portion of the nozzle assembly and the electrically conductive member of the heat shield when both the nozzle assembly and the heat shield are secured onto the torch body. When the heat shield or the nozzle assembly are removed, the electrical circuit is open and the electrical voltage flow to the electrode is disabled.

21 Claims, 2 Drawing Sheets

PLASMA ARC TORCH POWER DISABLING MECHANISM

FIELD OF THE INVENTION

This invention relates to a plasma arc torch power disabling mechanism in which voltage to the electrode is terminated whenever the heat shield is removed from the torch body.

BACKGROUND OF THE INVENTION

In a plasma arc torch, a high voltage is supplied to the electrode to create an electrical arc extending from the electrode and through the bore of a nozzle assembly. A flow of gas is generated between the electrode and the nozzle assembly to create a plasma flow through the bore to a workpiece positioned beneath the nozzle assembly. The high heat and electrical arc often damage the consumable components of the torch, such as the nozzle assembly and the electrode, and as a result, these components must be replaced. Typically, these components are threaded onto the torch body, and an operator unscrews the components from the torch body and replaces them when necessary.

During replacement of the consumable torch components, a danger exists that an operator may receive an electric shock if voltage still is supplied to the torch electrode. Without the protection afforded by the plasma torch's heat shield and nozzle assembly, the electrode is exposed. An operator may accidentally touch the electrode, causing an electric shock.

Some plasma arc torch designs include safety mechanisms which prevent electrical voltage to the electrode when the nozzle assembly or heat shield are removed or partially disassembled from the torch body. For example, U.S. Pat. Nos. 4,701,590, 4,959,520, and 4,973,816 disclose plasma arc torch designs in which spring actuated pistons and other parts move or slide within the torch body after the heat shield or nozzle assembly is removed.

These moving parts actuate a control mechanism which prevents electrical voltage to the electrode, thus preventing electrical shock of the operator who replaces the torch consumables. Although these torch safety mechanisms provide some measure of safety, moving pistons or other moving parts are not preferred because the torch not only is more complex and expensive with such safety systems, but also the torch life may be lessened without the additional maintenance necessary with the more complex safety systems having moving parts.

Other plasma arc torch safety systems propose a plasma arc torch interlock in which a nonmovable fault detect circuit senses a short between the electrode and the nozzle and disables the electrode power supply when the short is sensed. In U.S. Pat. No. 4,929,811, the fault detector circuit comprises a main cable which when punctured, contacts a main conductor, and in response to that contact, actuates a fault detector circuit to disable the power source that generates voltage to the electrode. In another embodiment, a spring wire provides continuity contact with a nozzle assembly to complete a closed loop circuit, which when broken, disables the electrode power source. However, in both embodiments, the heat shield can be removed without disabling the torch, resulting in a still dangerous situation in which the operator performing maintenance or replacement of the torch could receive an electrical shock.

SUMMARY OF THE INVENTION

It is therefore an object of the present invention to provide a plasma arc torch in which voltage to the electrode is disabled when either the heat shield or nozzle assembly is removed.

It is still another object of the present invention to provide a plasma arc torch having a mechanism for disabling voltage to the electrode when either the heat shield or nozzle assembly is removed and which does not use moving parts or a spring wire.

The plasma arc torch of the present invention provides a closed loop electrical circuit through the nozzle assembly and an electrically conductive member of the heat shield when the nozzle assembly and the heat shield are secured onto the torch body. When the formed electrical loop circuit is open, such as when the heat shield or nozzle assembly is removed, the voltage to the electrode is disabled, preventing electric shock to an operator during maintenance and repair of the torch.

In accordance with the present invention, the plasma arc torch comprises a torch body. An electrode is mounted within the torch body and has an arc discharge end. A nozzle assembly is positioned adjacent the discharge end of the electrode, and a bore extends through the nozzle assembly. A power supply is connected to the electrode for supplying an electrical voltage to the electrode to create an electrical arc extending from the electrode and through the bore of the nozzle assembly. The torch is designed to allow a flow of gas between the electrode and the nozzle assembly to create a plasma flow through the bore to a workpiece positioned beneath the nozzle assembly.

In one preferred embodiment, a nozzle assembly retainer member is removably secured onto the torch body and engages a nozzle member to retain the nozzle member in position adjacent the electrode. An outer heat shield is removably secured onto the torch body. The heat shield includes an electrically conductive member secured on the interior surface of the heat shield and in electrical contact with the nozzle assembly retainer member when the nozzle member, nozzle assembly retainer member, and the heat shield are secured onto the torch body.

When these components are secured onto the torch body, a closed loop electrical circuit is completed through the nozzle assembly retainer member and the electrically conductive member of the heat shield. When the heat shield or the nozzle assembly is removed, the loop is open. In this state, a controller disables the electrical voltage to the electrode to prevent operator injury. In another embodiment, the nozzle is threaded into an electrical contact member. A closed loop circuit is formed through the nozzle, and the electrically conductive member of the heat shield.

In the preferred embodiment, the plasma arc torch includes inner and outer contact members secured within the torch body through which the closed loop electrical circuit is generated. The torch includes an inner insulator member separating the inner contact member from the electrode. An intermediate insulator member separates the inner and outer contact members from each other. The outer contact member and the conductive member of the heat shield includes means for threadably coupling the outer contact member and the heat shield conductive member together.

The inner contact member is spaced from the nozzle assembly and includes threads thereon. In the preferred embodiment, the retainer member comprises a retaining nut threadably secured onto the inner contact member. The retaining nut is spaced from the heat shield to form an annular gas plenum. The gas plenum includes an annular outlet defined between the nozzle assembly and the heat shield through which a flow of secondary gas is discharged around the discharged plasma.

In another embodiment, the nozzle member is held in place by the retaining nut, which is threaded onto the inner insulator member. In this embodiment, the nozzle member is electrically isolated from the safety circuit formed by inner and outer contact members and the electrically conductive member secured onto the inner surface of the heat shield.

BRIEF DESCRIPTION OF THE DRAWINGS

While some of the objects and advantages of this invention have been set forth above, other objects and advantages will appear as the description proceeds in conjunction with the drawings in which.

DETAILED DESCRIPTION OF THE INVENTION

Figure 1:
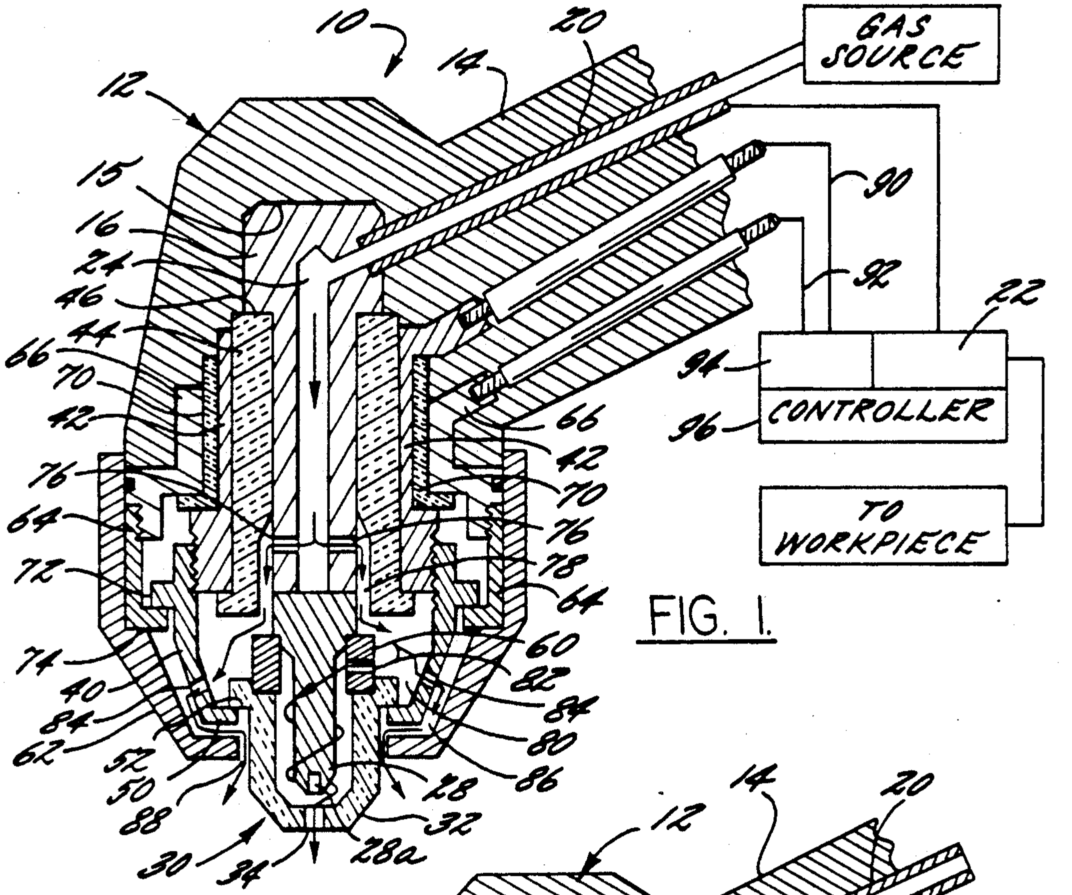
FIG. 1 is a sectional view of a first embodiment of a plasma arc torch in accordance with the present invention.

Referring now to FIG. 1, a first embodiment of the plasma arc torch 10 in accordance with the present invention is illustrated. The plasma arc torch includes a power disabling mechanism for disabling voltage to the torch electrode whenever the heat shield or nozzle assembly are removed. Although the illustrated embodiments of FIGS. 1 and 2 describe plasma arc torches 10 in which a flow of secondary gas is discharged around the discharged plasma, the power disabling mechanism of the present invention can be used with different plasma arc torch designs having a heat shield and nozzle assembly removably secured to the torch body. Additionally, FIGS. 1 and 2 disclose first and second embodiments in which a pilot arc is generated for starting torch operation. In FIG. 3, a third embodiment is illustrated in which a pilot arc is not generated.

As shown in FIG. 1, the plasma arc torch 10 includes a torch body indicated generally at 12. The torch body 12 is formed of a hard, heat-resistant material such as a thermoset plastic or epoxy compound which offers protection to the various torch components against the high heat generated during plasma arc torch welding or cutting. A handle portion 14 is integrally formed with the torch body 12 and extends rearwardly from the torch body 12 to enable grasping of the torch 10 by an operator.

The torch body 12 includes a internal cavity 15 having an electrode support body 16 received therein. The electrode support body 16 extends along a longitudinal axis with the torch body 12 as illustrated. The electrode support body 16 is formed of an electrically conductive material to enable it to carry voltage to an electrode removably supported on the electrode support body 16 and in electrical contact therewith. A power/gas tube 20 extends through the torch handle 14 and electrically connects to the electrode support body 16.

The power/gas tube 20 is connected to a primary power supply 22 which supplies the proper voltage to the electrode support body 16. Gas is also discharged through the central portion of the power/gas tube 20 and into a central gas cavity 24 formed within the electrode support body 16. The electrode support body 16 also supports an electrode 28 through which the current flows and from which the generated arc extends. As illustrated, the electrode includes an emissive insert 28*a* positioned at the arc discharge end of the electrode.

A nozzle assembly, indicated generally at 30, is positioned adjacent the discharge end of the electrode 28, and includes a cup shaped nozzle member 32 having a bore 34 extending therethrough. The gas provided through the power/gas tube 20 passes between the electrode 28 and the nozzle assembly 32 to create a plasma flow through the bore 34 to a workpiece (not shown) positioned adjacent the nozzle assembly 30. In the illustrated embodiment of FIG. 1, the nozzle assembly 30 is secured to the torch body 14 by a nozzle member retaining member in the form of a retaining nut 40, which is threaded onto an annular shaped electrically conductive inner contact member 42 secured within the torch body 12 The inner contact member 42 is secured onto an annular shaped, inner insulator 44. This inner insulator 44 is secured within the torch body 12 by an interference fit with a stepped section 46 of the electrode support body 16 as shown in FIG. 1.

The retaining nut 40 includes a lower flange 50 which engages an upper shoulder 52 of the nozzle 32 member to retain the nozzle member in position adjacent the electrode 28 when the retaining nut 40 is threaded onto the inner contact member 42. The upper portion of the nozzle member 32 engages a ceramic swirl baffle 60, pressing the ceramic swirl baffle 60 against the electrode support body 16.

A large, cup shaped, outer heat shield 62 is removably secured onto the torch body 12. The heat shield 62 is formed of a heat resistant material, such as a ceramic material, and includes an electrically conductive member 64 positioned on the interior surface of the heat shield. This electrically conductive member 64 is threaded and permits the heat shield 62 to be threaded onto an annular shaped, outer contact member 66 secured within the torch body 12 as shown in FIG. 1. The outer contact member 66 is spaced from the inner contact member 42 by an intermediate insulator member 70 so as to electrically separate the two contact members 42, 66 from each other. The electrically conductive member 64 includes an inwardly directed shoulder 74 which engages a lower shoulder surface 72 of the retaining nut 40 to form an electrical contact point.

As shown in FIG. 1, the described torch components are formed to enable gas flow not only around the electrode 28 and between the nozzle member 32 so that a plasma gas flow is formed, but also in protective relation to the discharged plasma as a secondary gas flow. Gas is discharged from the power/gas tube 20 into the central gas cavity 24 of the electrode support body 16, and outward therefrom through discharge passageways 76 extending transverse through the electrode support body. The gas passes through the discharge passageways 76 into an annular chamber 78 defined between the inner insulator 44 and the electrode support body 16, and then into a gas plenum space 80 defined between the retaining nut 40 and the swirl baffle 60 and nozzle member 32. Part of the gas enters a swirl orifice 82 of the swirl baffle, where the gas is discharged through the swirl baffle 60 in swirling relation into the space defined between the electrode 28 and the interior portion of the nozzle member 32. The gas is ionized by the electrical arc generated by the electrode, and the formed plasma is discharged through the bore 34 of the nozzle member 32 onto a workpiece positioned beneath the nozzle member 32.

Another portion of the gas is discharged through radially extending orifices 84 of the retaining nut 40, and into another gas plenum 86 defined between the interior surface of the outer heat shield 62 and the outer surface of the retaining nut 40. The lower portion of the heat shield 62 forms a secondary gas discharge opening through which the nozzle member 32 extends. This secondary gas discharge opening is dimensioned slightly larger than the outer dimensions of the nozzle member, and forms an annular gas discharge opening 88 through which a secondary gas flow is discharged into surrounding relation with the discharged plasma. The discharged secondary gas provides cooling to the nozzle 32 and some measure of protection to the plasma during plasma arc cutting and welding when much dust and other particulate matter are generated.

As shown in FIG. 1, a pilot arc cable 90 and safety cable 92 extend through the handle portion 14 of the torch body 12 and connect to respective inner and outer electrical contact members 42, 66. The cables 90, 92 connect to a secondary power supply 94 which generates voltage through the cables and to the contact members 42, 66. As illustrated, the power supply 94, cables 90, 92, contact members 42, 66 and retaining nut 40 form a closed loop electrical circuit.

The closed loop electrical circuit is connected to a controller 96, which also is operatively connected to the primary, electrode power supply 22. In accordance with the present invention, when the circuit is closed as shown in FIG. 1, the controller 96 enables the power supply 22 to generate voltage to the electrode, allowing arc generation and plasma flow outward through the nozzle member 32. If the heat shield 62 is removed or slightly turned, such as during periodic maintenance or repair of the torch, or the nozzle member 32 is not secured correctly within the torch, electrical contact between the heat shield conductive member 64 and the retaining nut 40 is broken and the controller 96 disables voltage to the electrode to prevent electrocution of the operator.

Figure 2:
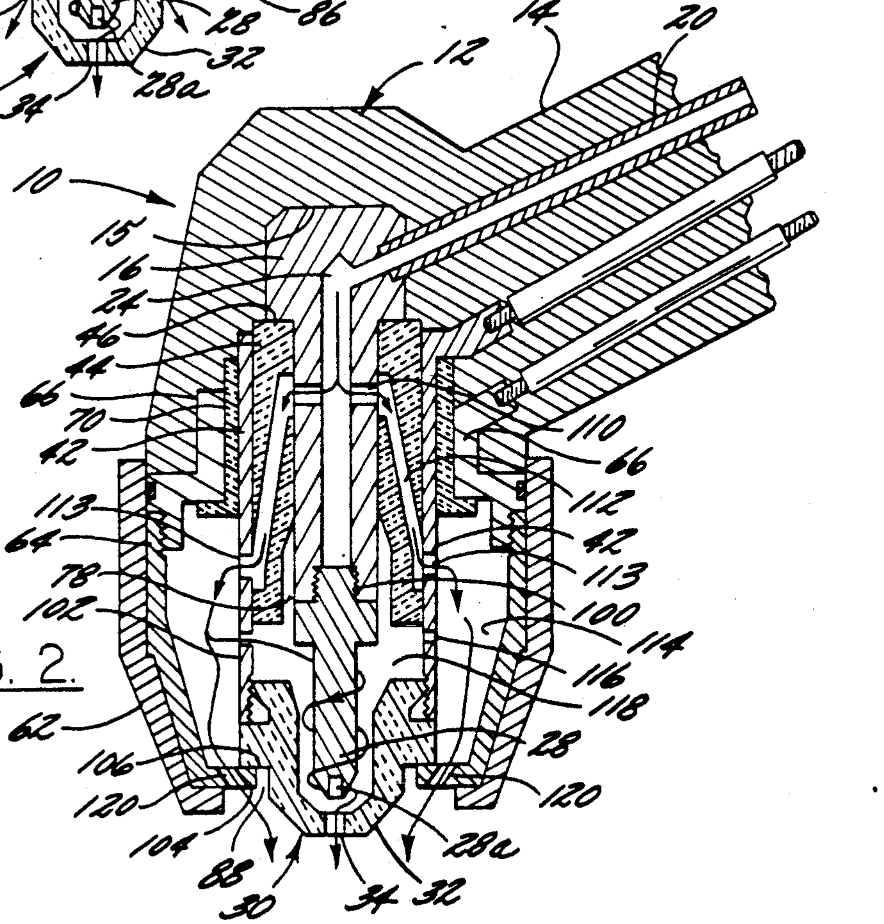
FIG. 2 is a sectional view of a second embodiment of a plasma arc torch in accordance with the present invention.
Figure 3:
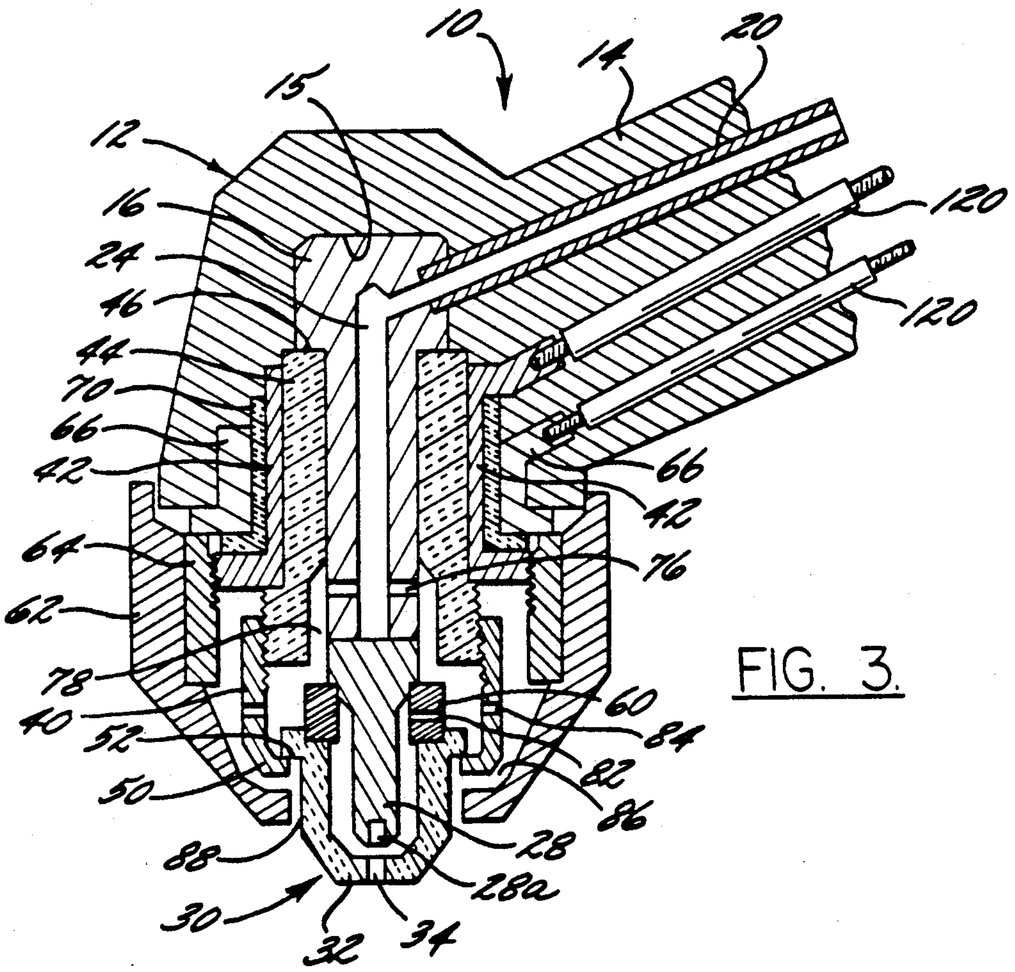
FIG. 3 is a sectional view of a third embodiment of a plasma arc torch in accordance with the present invention.

Referring now to FIG. 2, a second embodiment of the plasma arc torch in accordance with the present invention is illustrated. For purposes of understanding, similar reference numerals for similar torch components are maintained throughout the drawing. Only those torch components in the second embodiment which vary from the first embodiment are given prime notation or a new number.

In the illustrated embodiment of FIG. 2, the electrode 28 is threaded into a receiving channel 100 of the electrode support member 16. The inner contact member 42 includes an annular extension 102 having internal threads, and the nozzle member 32 is threaded into the annular extension 102. The heat shield electrically conductive member 64 extends downward along the interior surface of the heat shield. A lip 104 extends inward from the heat shield conductive member 64 and engages the lower portion of a shoulder 106 of the nozzle member 22.

As illustrated, a closed loop electrical circuit is formed through the outer contact member 66, the electrically conductive member 64 secured on the inside surface of the heat shield, the nozzle member 32 and the inner contact member 42. When the heat shield is removed 62 or ajar, or when the nozzle member is not threaded into the inner contact member 42, the electrical circuit is open and the controller disables voltage to the electrode.

In the second illustrated embodiment, the gas flows are different through the torch as compared to the first illustrated embodiment; however, the different gas flows do not adversely affect the safety circuit of the present invention. No swirl baffle is disclosed in the present, second embodiment. As illustrated, gas flows through the central passage 24 of the electrode support body 16, and outward therefrom through orifices 110 which flow through gas passageways 112 in the insulator 44. The gas then flows through an orifice 113 in the inner contact member 42, and into a plenum area 114 defined between the inner and outer contact members 42 and 66 and the electrically conductive member 64. A portion of the gas flows through orifices 116 of the extended portion of the inner contact member and into a gas plenum area 118 defined between the electrode 28 and the nozzle member 32. A further portion of the gas flows through lower gas discharge openings 120 formed in the lower shoulder portion of the heat shield electrically conductive member 64 to form a secondary gas flow.

Referring now to FIG. 3, a third embodiment of the plasma arc torch of the present invention is shown. The third embodiment does not use a pilot arc for starting operation; and thus a separate pilot arc cable is not illustrated. Only two safety circuit cables 120 are used for providing voltage to the closed loop electrical circuit forming the power disabling mechanism.

As illustrated, the nozzle assembly includes a nozzle member 32 and a nozzle assembly retainer member in the form of a retaining nut 40, which threads onto the insulator 44. The nozzle member 32 is pressed against a swirl baffle 60 as in the first embodiment illustrated in FIG. 1. The gas flows through the torch of FIG. 3 similar to the gas flow through the torch illustrated in FIG. 1.

In both torches gas is discharged from the power/gas tube 20 into the central gas cavity 24 of the electrode support body 16, and outward therefrom through discharge passageways 76 extending transverse through the electrode support body. The gas passes through the discharge passageways 76 into an annular chamber 78 defined between the inner insulator 44 and the electrode support body 16, and then into a gas plenum space 80 defined between the retaining nut 40 and the swirl baffle 60 and nozzle member 32.

Part of the gas enters a swirl orifice 82 of the swirl baffle, where the gas is discharged through the swirl baffle 60 in swirling relation into the space defined between the electrode 28 and the interior portion of the nozzle member 32. The gas is ionized by the electrical arc generated by the electrode, and the formed plasma is discharged through the bore 34 of the nozzle member 32 onto a workpiece positioned beneath the nozzle member 32.

Another portion of the gas is discharged through radially extending orifices 84 of the retaining nut 40, and into another gas plenum 86 defined between the interior surface of the outer heat shield 62 and the outer surface of the retaining nut 40. The lower portion of the heat shield 62 forms a secondary gas discharge opening through which the nozzle member 32 extends. This secondary gas discharge opening is dimensioned slightly larger than the outer dimensions of the nozzle member, and forms an annular gas discharge opening 88 through which a secondary gas flow is discharged into surrounding relation with the discharged plasma.

As illustrated, the nozzle member 32 and retainer nut 40 are insulated from the power disabling safety circuit of the present invention. The heat shield 62 is threaded via the electrically conductive member 64 onto the inner electrical contact member 42. When the heat shield 62 is secured onto the outer electrical contact member, the electrically conductive member 64 of the heat shield presses against the outer electrical contact member 66 forming an electrical contact point with that member 64. Thus, a closed loop electrical circuit is formed between the outer electrical contact member 66, the electrically conductive member 64, and the inner electrical contact member 42.

The present invention offers several benefits over other prior art power disabling mechanisms for plasma arc torches. In the present invention, voltage to the electrode is disabled whenever the heat shield is removed or unscrewed slightly. Many proposed prior art constructions disable voltage to the electrode only when the nozzle is removed, and do not offer the safety feature of the present invention in which voltage is disabled with removal of the heat shield. Additionally, no moving parts are used in the power disabling mechanism of the present invention, thus reducing the manufacturing cost of the torch and the maintenance required to maintain the torch in proper operation.

In the drawings and specification there has been set forth a preferred embodiment of this invention, and although specific terms are employed, they are used in a generic and descriptive sense only and not for purposes of limitation, the scope of the invention being defined in the following claims.

That which is claimed is:

1. A plasma arc torch comprising a torch body, an electrode mounted within the torch body and having an arc discharge end, a nozzle assembly positioned adjacent the discharge end of the electrode and a bore extending through the nozzle assembly, power supply means connected to said electrode for supplying an electrical current to the electrode to create an electrical arc extending from the electrode and through the bore of the nozzle assembly, means for generating a flow of gas between the electrode and the nozzle assembly to create a plasma flow through the bore to a workpiece positioned beneath the nozzle assembly, an outer heat shield removably secured onto the torch body, said heat shield including an electrically conductive member positioned on the interior surface of the heat shield and in electrical contact with the nozzle assembly when the nozzle assembly and the heat shield are secured onto the torch body, means for completing an electrical circuit through the nozzle assembly and the electrically conductive member of the heat shield when the nozzle assembly and heat shield are secured onto the torch body, and means for disabling electrical voltage to the electrode when the electrical circuit through the nozzle assembly and the conductive member is open such as when the nozzle assembly or heat shield is removed during nozzle assembly replacement so as to prevent electric shock to an operator during maintenance and repair of the torch.

2. A plasma arc torch according to claim 1 wherein said nozzle assembly includes a nozzle member and a nozzle assembly retainer member engaging the nozzle member and positioning the nozzle member adjacent the electrode, and wherein the nozzle assembly retainer member forms a part of the closed loop electrical circuit.

3. A plasma arc torch according to claim 1 including inner and outer electrical contact members which are secured within said torch body and through which part of the closed loop electrical circuit is formed.

4. A plasma arc torch according to claim 3 including an inner insulator member separating the inner electrical contact member from the electrode.

5. A plasma arc torch according to claim 3 including an intermediate insulator member separating the inner and outer electrical contact members from each other.

6. A plasma arc torch according to claim 3 wherein the outer contact member and the electrically conductive member of the outer shield member include means for threadably coupling the outer electrical contact member and the electrically conductive member together.

7. A plasma arc torch according to claim 3 wherein the inner electrical contact member is spaced from the inner nozzle assembly and includes threads thereon, and wherein said retainer member comprises a retaining nut which is threadably secured onto the inner electrical contact member.

8. A plasma arc torch according to claim 7 wherein the retaining nut is spaced from the heat shield to form a gas plenum, and wherein the gas plenum includes an outlet defined between the nozzle assembly and the heat shield through which a flow of secondary gas in discharged around the plasma discharged through the bore of the nozzle assembly.

9. A plasma arc torch according to claim 3 wherein said closed loop electrical circuit includes a pilot arc cable connected to one of either of said inner or outer electrical contact members.

10. A plasma arc torch comprising a torch body, an electrode mounted within the torch body and having an arc discharge end, a nozzle member positioned adjacent the discharge end of the electrode and having a bore extending therethrough, power supply means connected to said electrode for supplying an electrical current to the electrode to create an electrical arc extending from the electrode and through the bore of the nozzle member, means for generating a flow of gas between the electrode and the nozzle member to create a plasma flow through the bore to a workpiece positioned beneath the nozzle member, an outer heat shield removably secured onto the torch body, said heat shield including an electrically conductive member positioned on the interior surface of the heat shield and in electrical contact with the nozzle member when the nozzle member and the heat shield are secured onto the torch body, means for completing an electrical circuit through the nozzle member and the electrically conductive member of the heat shield engaging the nozzle member when the nozzle member and heat shield are secured onto the torch body, and means for disabling electrical voltage to the electrode when the electrical circuit through the nozzle member and the conductive member is open such as when the heat shield or nozzle member is removed during nozzle member replacement so as to prevent electric shock to an operator during maintenance and repair of the torch.

11. A plasma arc torch according to claim 10 including inner and outer electrical contact members which are secured within the torch body and through which part of the closed loop electrical circuit is formed.

12. A plasma arc torch according to claim 11 including an inner insulator member separating the inner electrical contact member from the electrode.

13. A plasma arc torch according to claim 11 including an intermediate insulator member separating the inner and outer electrical contact members from each other.

14. A plasma arc torch according to claim 11 wherein the outer electrical contact member and the conductive member of the heat shield member includes means for threadably coupling the outer electrical contact member and the heat shield conductive member together.

15. A plasma arc torch according to claim 11 wherein the inner electrical contact member includes an annular extension having threads thereon and onto which the nozzle member is threaded.

16. A plasma arc torch according to claim 11 wherein said closed loop electrical circuit includes a pilot arc cable connected to one of either of said inner or outer electrical contact members.

17. A plasma arc torch comprising a torch body, an electrode mounted within the torch body and having an arc discharge end, an inner electrical insulator member secured within the torch body, a nozzle assembly secured onto the inner electrical insulator member and positioned adjacent the discharge end of the electrode and having a bore extending through the nozzle assembly, power supply means connected to said electrode for supplying an electrical current to the electrode to create an electrical arc extending from the electrode and through the bore of the nozzle assembly, means for generating a flow of gas between the electrode and the nozzle assembly to create a plasma flow through the bore to a workpiece positioned beneath the nozzle assembly, inner and outer electrical contact members secured within the torch body and being spaced electrically insulated from each other, an outer heat shield removably secured onto the torch body, said heat shield including an electrically conductive member positioned on the interior surface of the heat shield and in electrical contact with the electrical contact members when the nozzle assembly and the heat shield are secured onto the torch body, means for generating a closed loop electrical circuit through the electrical contact members and the electrically conductive member of the heat shield when the nozzle assembly and heat shield are secured onto the torch body, and means for disabling electrical voltage to the electrode when the electrical loop circuit through the contact members and the conductive member is open such as when the nozzle assembly or heat shield is removed during nozzle assembly replacement so as to prevent electric shock to an operator during maintenance and repair of the torch.

18. A plasma arc torch according to claim 17 wherein the nozzle assembly includes a nozzle member and a nozzle assembly retainer member engaging the nozzle member and positioning the nozzle member adjacent the electrode, and wherein the nozzle assembly retainer member and the nozzle member are insulated from the closed loop electrical circuit.

19. A plasma arc torch according to claim 17 including an intermediate insulator member separating the inner electrical contact member from the outer electrical contact member.

20. A plasma arc torch according to claim 17 wherein the inner electrical contact member and the electrically conductive member of the heat shield includes means threadably coupling the inner electrical contact member and the electrically conductive member of the heat shield together.

21. A plasma arc torch according to claim 17 wherein the inner insulator member includes threads thereon, and wherein the nozzle assembly retaining member comprises a retaining nut which is threadably secured onto the threads of the inner insulator member.

* * * * *